United States Patent [19]

Courbot

[11] Patent Number: 4,463,837
[45] Date of Patent: Aug. 7, 1984

[54] SPRING FOR DISC BRAKE

[75] Inventor: Pierre Courbot, Villiers le Bel, France

[73] Assignee: Societe Anonyme D.B.A., Paris, France

[21] Appl. No.: 345,175

[22] Filed: Feb. 3, 1982

[30] Foreign Application Priority Data

Feb. 19, 1981 [FR] France ................. 81 03268

[51] Int. Cl.³ .............................................. F16D 65/02
[52] U.S. Cl. ................................. 188/73.38; 188/73.44
[58] Field of Search ............... 188/73.31, 73.35, 73.36,
188/73.37, 73.38, 73.39, 73.44, 73.45, 205 A,
206 R, 206 A, 250 E, 250 F

[56] References Cited

U.S. PATENT DOCUMENTS

| 3,368,647 | 2/1968 | Laverdant | 188/73.39 |
| 3,391,761 | 7/1968 | Brueder | 188/73.38 |
| 3,612,226 | 10/1971 | Pauwels et al. | 188/73.36 |
| 3,625,316 | 12/1971 | Mori | 188/73.35 |
| 3,972,393 | 8/1976 | Courbet et al. | 188/73.31 |
| 4,360,079 | 11/1982 | Belart | 188/73.36 |
| 4,360,081 | 11/1982 | Ito et al. | 188/73.38 |

FOREIGN PATENT DOCUMENTS

| 2399 | 6/1979 | European Pat. Off. | 188/73.36 |
| 30502 | 6/1981 | European Pat. Off. | |
| 59128 | 9/1982 | European Pat. Off. | 188/73.37 |
| 1927459 | 5/1970 | Fed. Rep. of Germany | 188/73.36 |
| 2049035 | 4/1971 | Fed. Rep. of Germany | |
| 2114812 | 10/1971 | Fed. Rep. of Germany | 188/73.38 |
| 2345733 | 3/1975 | Fed. Rep. of Germany | |
| 2514383 | 4/1975 | Fed. Rep. of Germany | |
| 2713360 | 9/1977 | Fed. Rep. of Germany | |
| 2408766 | 6/1979 | France | |
| 52-9770 | 1/1977 | Japan | 188/73.45 |
| 2046855 | 11/1980 | United Kingdom | 188/73.36 |
| 2056601A | 3/1981 | United Kingdom | |
| 2060093 | 4/1981 | United Kingdom | 188/73.38 |

Primary Examiner—Douglas C. Butler
Assistant Examiner—R. R. Diefendorf
Attorney, Agent, or Firm—Larry J. Palguta; Paul D. Schoenle; Ken C. Decker

[57] ABSTRACT

The invention relates to a spring (40) for a disc brake of the type comprising a caliper (10) mounted slidingly parallel to the axis of a rotating disc (30) on a fixed support by way of at least two axial sliding surfaces (14, 18) formed on the caliper (10) and on the fixed support and maintained elastically in contact, and two friction members (22, 24) received in anchorage and in axial sliding motion in an opening (34) in the fixed support to become frictionally engaged with the opposed faces of the disc on actuation of a brake motor (32). The spring is disposed between the caliper (10) and the supporting plates (26, 28) of the friction members (22, 24) and exerts on the latter a radial force ($\vec{R}$) directed approximately along a radius of the disc (30) and in the direction of the axis of the latter and a tangential force ($\vec{T}$) perpendicular to said radial force ($\vec{R}$) to urge each of the friction members (22, 24) tangentially to the circumference of the disc to ensure maintaining of the latter in a preferential lateral position, the spring elastically urging the caliper (10) radially toward the exterior to ensure maintaining in contact of the sliding surfaces (16, 18). The spring consists of a bent metal leaf comprising two main arms (42, 44) connected by a central bend (52) and a hooking arm (80).

9 Claims, 9 Drawing Figures

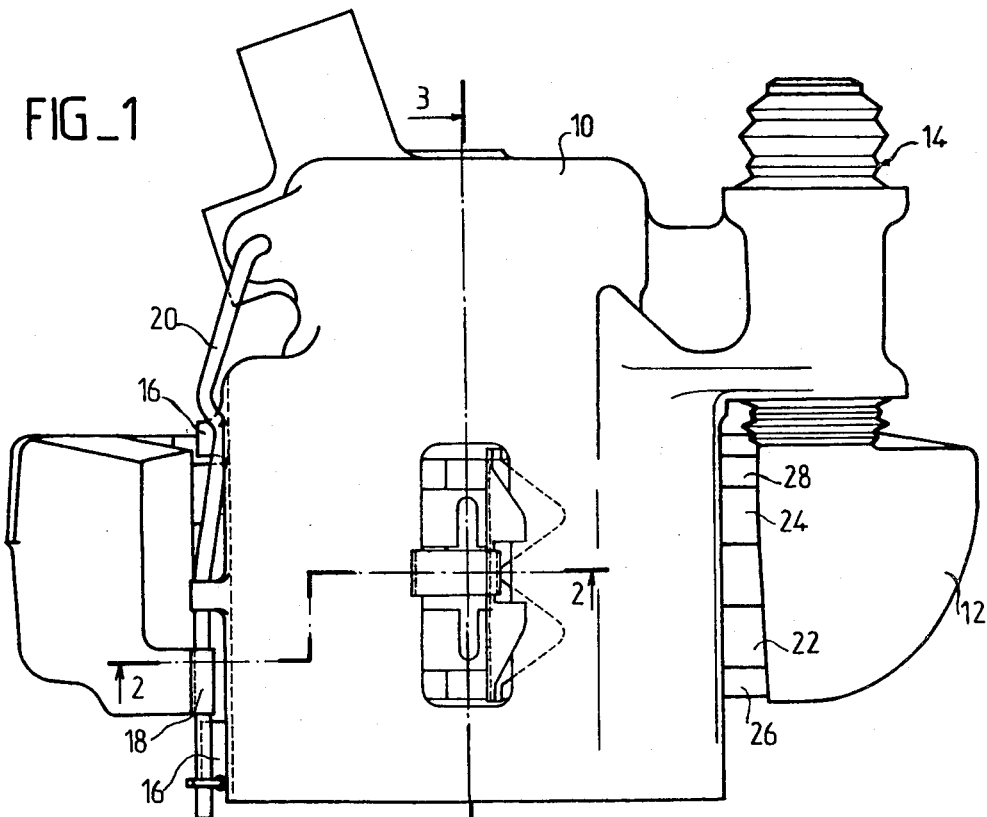
FIG_1
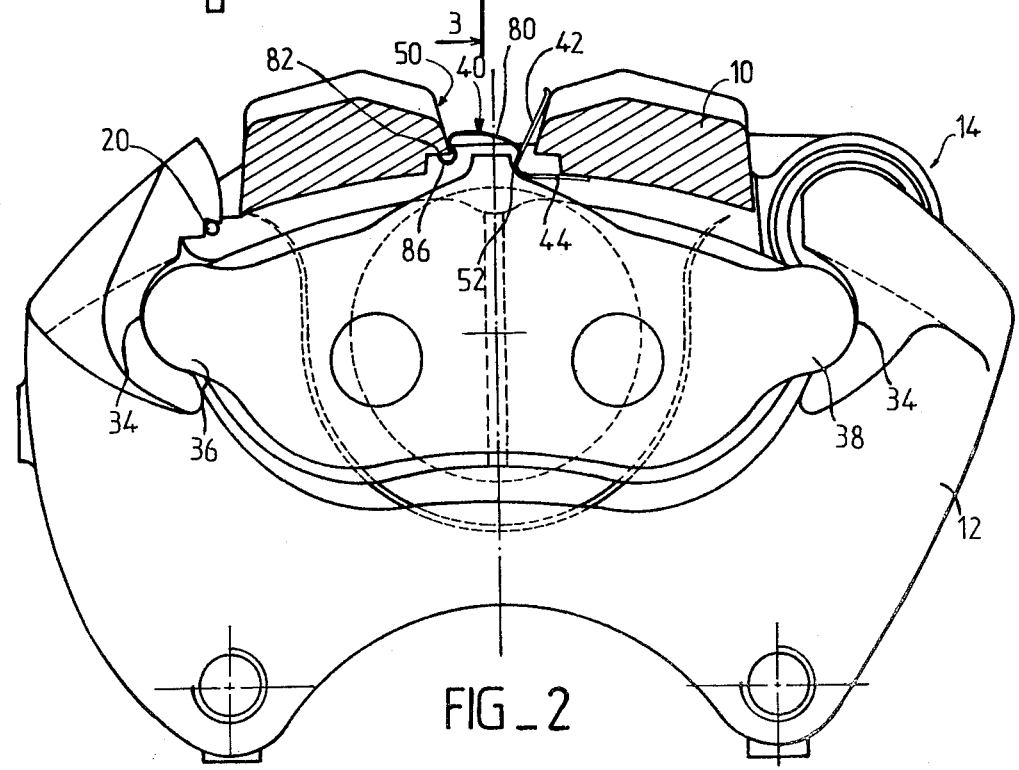
FIG_2

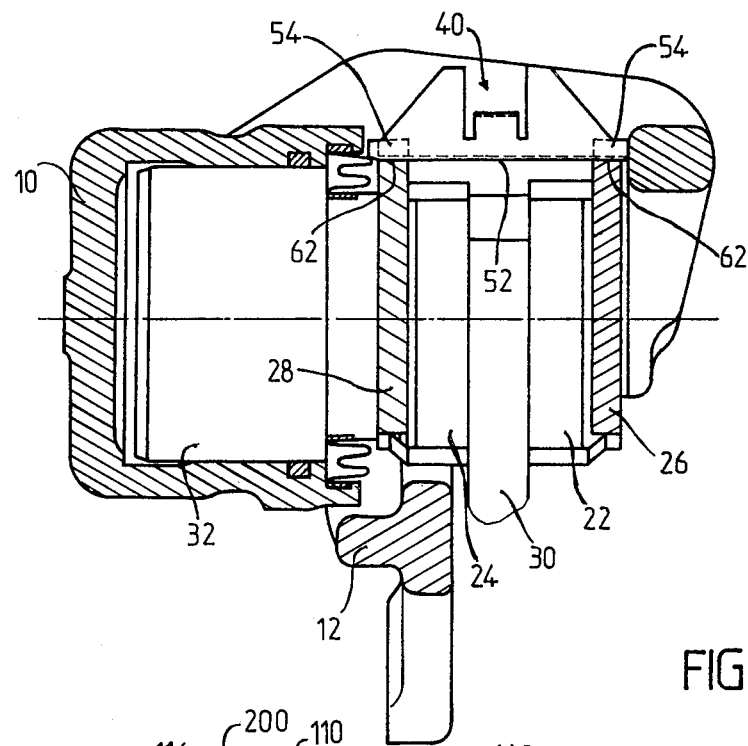
FIG_3
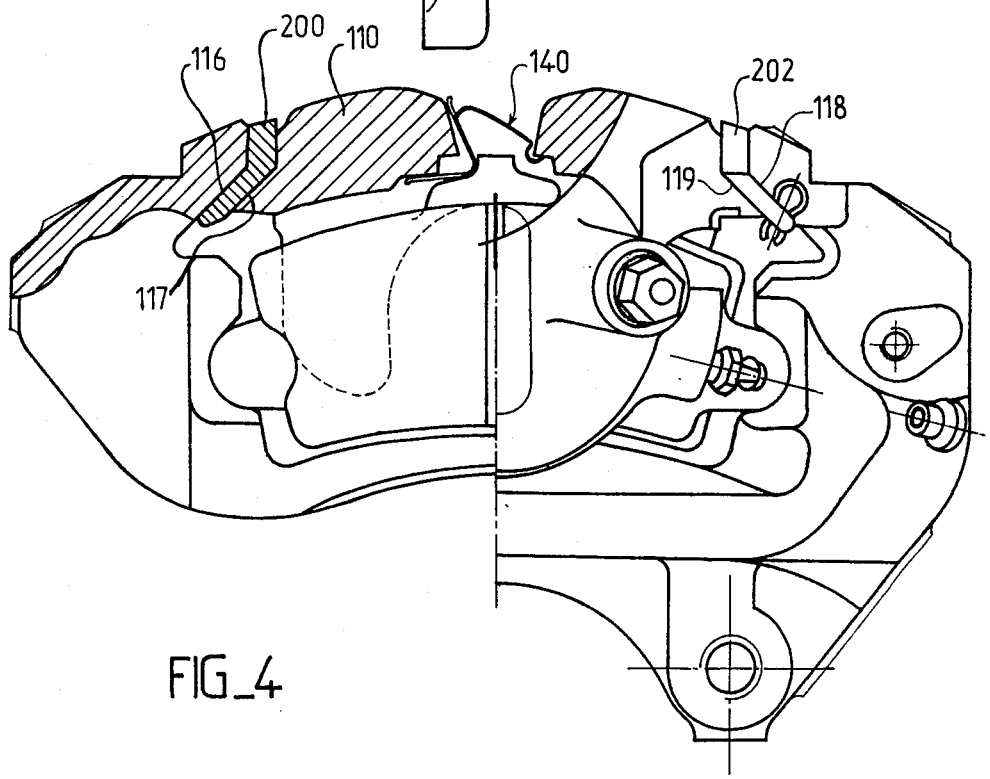
FIG_4

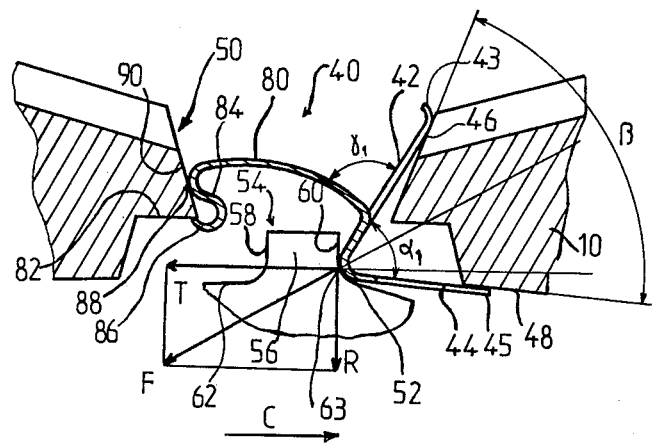
FIG_5
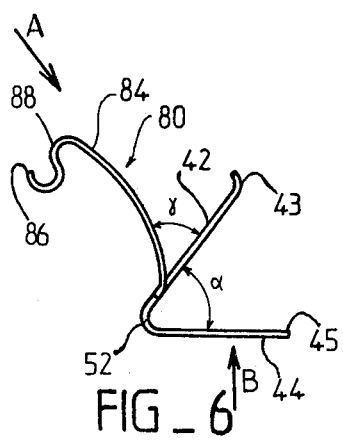
FIG_6
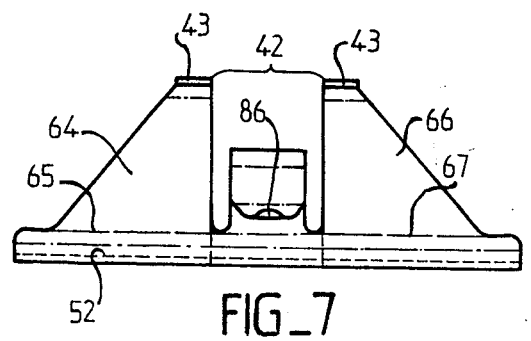
FIG_7
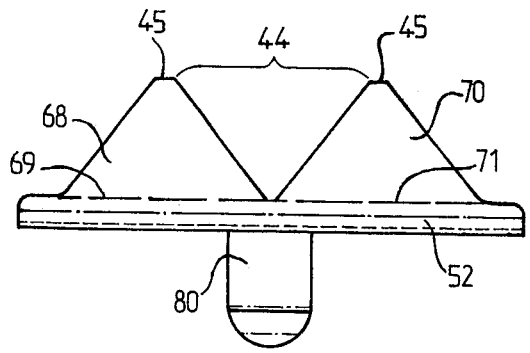
FIG_8
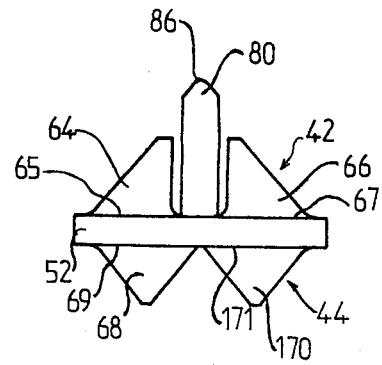
FIG_9

SPRING FOR DISC BRAKE

The invention relates to a spring for a sliding caliper disc brake as well as a disc brake equipped with such a spring.

The invention relates more particularly to a multiple function spring designed to equip a disc brake of which the caliper slides relative to a fixed support by means of at least two axial sliding complementary surfaces formed on the caliper and on the fixed support and which are maintained in contact by elastic means.

Among disc brakes of the type mentioned above are distinguished two main groups: firstly, disc brakes of which the caliper is mounted slidingly relative to the fixed support by means of an axial post received in sliding motion in a corresponding bore and by means of two sliding surfaces formed facing each other on the caliper and on the fixed support. Such a brake is described and shown in the GB Pat. No. 1,532,572. In such a brake it is necessary to provide elastic means to maintain said surfaces in contact as well as anti-noise springs designed to hold the friction members in abutment in the opening provided in the fixed support for receiving them. It has already been proposed in European patent application No. 80 401723.4 to use a single spring disposed between the caliper and the friction members ensuring the double function of maintaining said sliding surfaces in contact and of anti-noise spring for the friction members.

Secondly, disc brakes of which the caliper is mounted slidingly on the fixed support by means of two pairs of complementary sliding surfaces formed respectively on the caliper and on the fixed support, said pairs of sliding surfaces being maintained in contact by means of two springs disposed on both sides of the median axial plane of the brake. Such a brake is described and shown in French Pat. No. 77-33888 published under the No. 2,408,766. In such a brake it is moreover necessary to provide anti-noise springs for the friction members in order to hold the latter in abutment in the opening in the fixed support in which they are received.

In the two groups of brakes which have just been described, it may be desirable to fit a particular type of friction members to which it is necessary to apply a permanent tangential force, urging these friction members into abutment in the opening in the fixed support in a preferential lateral position. Such a type of friction member is described and shown in European patent application No. 78 400170.3 published under the No. 0 002 399. This latter European patent application shows notably the use of such friction members applied to a brake belonging to the second group described above. It is ascertained on reading this document that it is necessary to provide for each of the friction members an independent spring urging each member into its preferential lateral position as well as the two caliper holding springs mentioned above.

It appears desirable to reduce the number of elastic springs used in the two groups of brake described above when friction members with preferential lateral position are used, and the object of the invention is to propose a single spring which ensures maintaining in contact of the axial sliding surfaces, which ensures the function of anti-noise spring for the friction members and which ensures the function of maintaining the latter in a preferential lateral position.

Japanese patent application No. 54/088653 U published on Jan. 22, 1981 under No. 7130/81 proposes a spring for disc brake of the type comprising a caliper mounted slidingly parallel to the axis of a rotating disc on a fixed support, and two friction members received in anchorage and in axial sliding motion in an opening in said fixed support to become frictionally engaged with the opposed faces of said disc on actuation of a brake motor, said spring being mounted in an opening of the arch of the caliper and exerting on the supporting plates of said friction member a radial force directed approximately along a radius of the disc and in the direction of the axis of the latter and a tangential force perpendicular to said radial force to urge each of the friction members tangentially to the circumference of said disc to ensure maintaining of the latter in a preferential lateral position.

The invention proposes a spring for disc brake of the type comprising a caliper mounted slidingly parallel to the axis of a rotating disc on a fixed support by means of at least two axial sliding surfaces formed on the caliper and on the fixed support and maintained elastically in contact, and two friction members received in anchorage and in axial sliding motion in an opening in said fixed support to become frictionally engaged with the opposed faces of said disc on actuation of a brake motor, said spring being mounted in an opening of the arch of the caliper and exerting on the supporting plates of said friction members a radial force $\vec{R}$ directed approximately along a radius of the disc and in the direction of the axis of the latter and a tangential force $\vec{T}$ perpendicular to said radial force $\vec{R}$ to urge each of the friction members tangentially to the circumference of said disc to ensure maintaining of the latter in a preferential lateral position, characterized in that it consists of a bent metal leaf comprising two main arms connected by a central bend, said spring exhibiting in section the shape of a "V" of which the branches consist of said main arms, the latter cooperating with two approximately planar surfaces formed on the caliper and extending parallel to the axis of the disc, said surfaces forming between them an angle ($\beta$) greater than the angle ($\alpha$) formed by said main arms, said central bend cooperating with a bearing surface formed on each of said supporting plates of the friction members to exert on the latter an elastic force $\vec{F}$ composed of said radial force $\vec{R}$ and said tangential force $\vec{T}$.

There will now be described, by way of example without limitations, a spring constructed according to the information of the present invention as well as its application to two disc brakes of different type, referring to the attached drawings, in which:

FIG. 1 shows a first disc brake provided with a spring constructed according to the present invention;

FIG. 2 is a view in partial section along line 2—2 of FIG. 1;

FIG. 3 is a view in section along line 3—3 of FIG. 1;

FIG. 4 shows in partial section a second disc brake equipped with a spring constructed according to the present invention;

FIG. 5 is an enlarged view of a detail of FIG. 2 showing installation of the spring in the arch of the caliper of the disc brake;

FIG. 6 is a side view of the spring according to the present invention;

FIG. 7 is a view according to the arrow A of FIG. 6;

FIG. 8 is a view according to the arrow B of FIG. 6; and

FIG. 9 is a developed theoretical view of the spring of FIG. 6.

The disc brake shown in FIGS. 1 to 3 is of the type comprising a caliper 10 mounted slidingly on a fixed support 12 by means of an axial post 14. Sliding of the caliper 10 relative to the fixed support 12 is likewise ensured by means of axial surfaces 16 and 18 formed respectively on the caliper 10 and the fixed support 12 between which is interposed, in the embodiment shown, a locking element of wire 20. The disc brake further comprises two friction members 22 and 24 provided respectively with supporting plates 26 and 28, capable of becoming frictionally engaged with a rotating disc 30 on actuation of a hydraulic brake motor 32. The friction members 22 and 24 are received in anchorage and in sliding motion in an opening 34 formed in the fixed support 12. In the example shown, the two friction members 22 and 24 have ends 36 and 38 having a circular profile cooperating with complementary circular profiles of the opening 34. Such a type of friction member is described and shown in more detail in the European patent application published under the No. 0 002 399. For this type of friction member it is desirable to exert on the supporting plate a tangential force which maintains the latter in a preferential lateral position in abutment in the opening arranged in the fixed support 12.

The disc brake shown in FIGS. 1 to 3 is provided with a spring 40 constructed according to the present invention. For the description of the spring 40, reference will be made notably to FIGS. 5 to 9. The spring 40 consists of a bent metal leaf which includes two main arms 42 and 44, and which exhibit in section through a plane perpendicular to the axis of the brake the shape of a "V". The branches of the "V" consist of said main arms 42 and 44 which form between them an angle $\alpha$. As can be ascertained from FIG. 5, the main arms of the spring 40 cooperate with two surfaces 46 and 48 formed in an opening 50 of the arch of the caliper 10. The surfaces 46 and 48 of the opening 50 are approximately planar and extend parallel to the axis of the disc 30 and form between them an angle $\beta$. A central bend 52 of the spring 40 connects the main arms 42 and 44 and extends parallel to the axis of the disc 30 and constitutes the apex of said "V". When the spring 40 is installed in the arch of the caliper 10 and the latter occupies, relative to the fixed support 12, its normal operating position, the central bend 52 of the spring cooperates with the upper part 54 of each of the supporting plates 26 and 28 of the friction members 22 and 24. The upper part 54 of the supporting plates is provided with a lug 56 extending radially towards the exterior and comprising lateral edges 58 and 60. Each of the lateral edges 58 and 60 form with the upper face 62 of the supporting plate of the friction member an angle of support 63 for the spring 40. In the example shown and notably in FIG. 5, the central bend of the spring 40 is received in abutment in the angle 63 constituted by the lateral face 60 of the lug 56 and the upper face 62 of the supporting plate of the friction member. When the spring 40 is installed in the caliper 10 and the latter occupies its normal operating position shown in FIG. 5, the two surfaces 46 and 48 formed in the opening 50 of the arch of the caliper 10 cooperate with the main arms 42 and 44 of the spring 40 and act between the latter as a wedge tending to move the arms 42 and 44 apart. As can be ascertained from FIG. 5, the angle $\alpha_1$ separating the arms 42 and 44 of the spring 40 is greater than the angle $\alpha$ separating the arms of the spring when the latter is not installed and as it is shown in FIG. 6. The wedge effect induced by introduction of the wedge constituted by the surfaces 46 and 48 which form between them an angle $\beta$ greater than the initial value $\alpha$ of the angle of the "V" induces an elastic action $\vec{F}$ of the spring 40 on the supporting plate of each of the friction members of which the direction is approximately that of the bisector of the angle $\alpha_1$. As can be ascertained from FIG. 5, the spring 40 applies the force $\vec{F}$ to the supporting plate of each of the friction members in the angle of support formed by the lateral face 60 of the lug 56 and the upper face 62 of the supporting plate. The elastic force $\vec{F}$ exerted by the spring 40 can be broken down into a radial force $\vec{R}$ directed approximately along a radius of the disc 30 and in the direction of the axis of rotation of the latter, and into a tangential force $\vec{T}$ perpendicular to the force $\vec{R}$. The tangential force $\vec{T}$ urges each of the friction members tangentially to the circumference of the disc and ensures maintaining of the latter in a preferential lateral position in which the rounded end 36 of the supporting plate (see FIG. 2) is maintained in lateral abutment in the opening 34 formed in the fixed support 12. The radial force $\vec{R}$ applied to each of the supporting plates of the friction members urges the latter radially towards the axis of the disc and maintains the two rounded ends of the supporting plates of the friction members in internal radial abutment in the opening 34 in the support 12. By reaction, the spring 40 elastically urges the caliper 10 radially towards the exterior, that is, in a direction tending to pivot the caliper 10 around the post 14 in a clockwise direction when looking at FIG. 2; on account of this urging, the axial sliding surfaces 16 and 18 are maintained in contact with the elastic closure element 20.

According to a characteristic of the invention, the main arms of the spring 40 cooperate with the surfaces 46 and 48 of the arch of the caliper by their respective ends 43 and 45. The end 43 is slightly bent back so as to cooperate with the surface 46 by a generatrix of this bent end extending approximately parallel to the axis of the disc. On account of this characteristic, the spring ends 43 are capable of sliding over the face 46 towards the exterior of the arch of the caliper upon closure of the caliper and fixed support by rotating the caliper about the post 14, which pivots the spring 40 to position the central bend 52 in front of the lugs 56 and in abutment with the angles of support 63 of the friction members. Moreover, on actuation of the brake, the friction members move in the direction indicated by the arrow C of FIG. 5, that is, counter to the tangential force $\vec{T}$ exerted by the spring 40. During this displacement, the spring slides over the above-mentioned generatrix, the main arm 44 likewise sliding parallel to the surface 48 formed on the caliper. It can be understood that on account of these synchronized displacements, the value of the force $\vec{F}$ by thrusting of the wedge between the arms 42 and 44 increases and that thus the elastic tangential return force $\vec{T}$ applied to the block likewise sees its value increased. As can be ascertained from FIGS. 7 and 8, the main arms 42 and 44 exhibit a section which increases from their respective ends 43 and 45, by which they cooperate with the surfaces 46 and 48 formed in the arch of the caliper, up to the central bend 52 of the spring 40. The variable section of each of the main arms obtains for them a maximum inertia close to the central bend of the spring 52 defining the apex of the "V", with stresses being highest in the bend. The variable section allows in other respects high flexibility of each of the main arms 42,44 to be obtained, this flexibility being obtained by a minimum inertia close to the ends 43 and 45. Thus is obtained an elastic force $\vec{F}$ exerted by the spring on the blocks of an approximately constant value, whatever the variations in tolerance of the respective position of the block of the caliper. The main arm 42 consists, as can be ascertained from FIG. 7, of two triangles 64,66 which are symmetrical relative to the median plane of the spring 40, of which the bases 65,67 are connected to the central bend 52 of the spring 40 and of which the opposed apices constitute said bent end 43 of the main arm 42. The main arm 44 consists of two triangles 68,70 which are symmetrical relative to the median plane of the spring 40, of which the bases 69,71 are connected to the central bend 52 of the spring 40 and of which the opposed apices constitute said bearing end 45 of the spring 40 on the surface 48 of the caliper. It can be understoood that on account of these particular forms, the arms 42 and 44 have a minimum mean inertia less than the inertia which arms 42 and 44 of rectangular shape would have.

According to a further characteristic of the invention, the spring 40 is provided with a hooking arm 80 which allows fixing of the spring 40 in the opening 50 formed in the arch of the caliper 10 to be ensured. In the embodiment shown, the hooking arm 80 extends between the triangles 64 and 66 from the central bend 52 of the spring 40. The hooking arm 80 forms with the main arm 42 an angle $\gamma$ and extends away from the latter to cooperate with a hooking surface 82 formed in the opening 50 opposite the surfaces 46 and 48. The arm 80 cooperates with the hooking surface 82 by its free end 84 on which is formed a hook 86.

As can be ascertained from FIG. 5, when the spring 40 is installed in the opening 50, the hooking arm 80 forms with the main arm 42 an angle $\gamma$ of a value greater than the angle at rest. It can be understood that in this way the hook 86 cooperates elastically with the surface 82 and that the spring 40 is maintained elastically in the opening 50.

The arm 80 likewise participates in the elastic action $\vec{F}$ exerted by the spring 40 on the friction members. In fact, the portion 88 of the end 84 of the hooking arm 80 is supported on a bearing surface 90 formed in the opening 50 and exerts on the central bend 52 of the spring an elastic force increasing the wedge effect applied to the main arms 42 and 44.

A disc brake has been shown in FIG. 4, of the type of the one described in European patent application published under the No. 0 002 399 in which a caliper 110 is mounted slidingly on a fixed support 112 by means of two pairs of complementary sliding surfaces 116,118 and 117,119 formed on the fixed support 112 and on the caliper 110.

Two sliding keys 200 and 202 are interposed between the surfaces 116,117 and 118,119, respectively. The disc brake shown in FIG. 4 is provided with a spring 140 in every way identical with the spring 40 which has just been described. The spring 40 ensures maintaining in contact the axial sliding surfaces and has the above-mentioned double elastic action on the friction members. It is ascertained that on account of use of the spring 140, it has been possible to eliminate use of the two caliper springs and the two friction member springs usually used in this type of brake.

I claim:

1. A spring (40) for a disc brake of the type comprising a caliper (10) mounted slidingly parallel to the axis of a rotating disc (30) on a fixed support (12) by means of at least two axial sliding surfaces (16, 18) formed on the caliper (10) and on the fixed support and maintained elastically in contact, and two friction members (22, 24) with respective supporting plates (26, 28) received in anchorage and for axial sliding motion in an opening (34) in said fixed support for frictional engagment with the opposed faces of said disc upon actuation of a brake motor (32), said spring being mounted in an opening (50) of an arch of the caliper and exerting on the supporting plates of said friction members of radial force ($\vec{R}$) directed approximately along a radius of the disc (30) and a tangential force ($\vec{T}$) perpendicular to said radial force ($\vec{R}$) to urge each of the friction members (22, 24) tangentially to the circumference of said disc to ensure maintaining of the friction members (22, 24) in a preferential lateral position, characterized in that the spring (40) comprises a bent metal leaf having two main arms (42, 44) connected by a central bend (52), said spring (40) exhibiting in section the shape of a "V" of which the branches consist of said main arms (42, 44), the arms cooperating with two approximately planar surfaces (46, 48) formed on the caliper (10) and extending parallel to the axis of the disc (30), said planar surfaces (46, 48) forming between them an angle ($\beta$) greater than an angle ($\alpha$) formed by said main arms, said central bend (52) cooperating with a bearing surface (63) formed on each of said supporting plates (26, 28) of the friction members (22, 24) to exert on the friction members an elastic force ($\vec{F}$) composed of said radial force ($\vec{R}$) and said tangential force ($\vec{T}$), said bearing surface (63) constituted by an angle of support (63) provided on a lug (56) disposed on an upper part of each of said supporting plates (26, 28), the angle of support including an upper face (62) of the respective support plate and with said central bend (52) being supported in said angle of support (63).

2. The spring according to claim 1, characterized in that when the spring (40) occupies its normal operating position, the bisectors of said angles ($\alpha$) and ($\beta$) are approximately identical.

3. The spring according to claim 1, characterized in that each of said main arms (42, 44) cooperates with one of said surfaces (46, 48) formed on the caliper, by means of respective ends (43, 45) opposite said central bend (52).

4. The spring according to claim 3, characterized in that at least one of said main arms (42, 44) has a section increasing from the respective end (43, 45) up to said central bend (52).

5. The spring according to claim 4, characterized in that said main arms (42, 44) consist of two triangles (64–66, 68, 70) which are symmetrical relative to the median plane of the spring and of which the bases (65–67, 69, 71) are connected to said central bend, the apices of said triangles constituting said ends of said main arms.

6. The spring according to claim 1, further comprising a hooking arm (80) extending from said central bend (52) to cooperate with a hooking surface (82) formed on said caliper.

7. The spring according to claim 6, characterized in that a free end (84) of said hooking arm (80) is provided with a hook (86) cooperating with said hooking surface (82).

8. The disc brake according to claim 1, further comprising an axial post (14) for pivoting the caliper (10) thereabout, wherein said spring (40) elastically urges said caliper radially outwardly to ensure maintaining in contact said sliding surfaces.

9. The disc brake according to claim 1, further comprising a second pair of axial sliding surfaces (119-117, 118-116) formed on the caliper (110) and the fixed support (112), respectively, wherein said spring elastically urges said caliper (110) radially outwardly to ensure maintaining in contact said sliding surfaces (119-117, 118-116).

* * * * *